United States Patent [19]

Mizuno

[11] Patent Number: 4,776,118
[45] Date of Patent: Oct. 11, 1988

[54] DISPLAY DEVICE
[75] Inventor: Goro Mizuno, Kyoto, Japan
[73] Assignee: Decos Co., Ltd., Kyoto, Japan
[21] Appl. No.: 829,417
[22] Filed: Feb. 13, 1986
[30] Foreign Application Priority Data Feb. 13, 1985 [JP] Japan ............................... 60-19598[U]
Mar. 6, 1985 [JP] Japan ............................... 60-32458[U]

[51] Int. Cl.[4] ............................................. G09F 13/12
[52] U.S. Cl. ...................................... 40/219; 272/8 M; 358/238
[58] Field of Search ................. 40/582, 560, 361, 367; 353/75, 77, 78, 10; 358/238, 237, 231, 255, 254; 272/8 M

[56] References Cited

U.S. PATENT DOCUMENTS

| | | | |
|---|---|---|---|
| 922,722 | 5/1909 | Salle | 272/8 M |
| 995,607 | 6/1911 | Kempinski | 272/8 M |
| 1,044,715 | 11/1912 | Wearn | 40/560 |
| 1,699,689 | 1/1929 | Curry | 272/8 M |
| 2,112,314 | 3/1938 | Spandau | 40/219 |
| 2,215,396 | 9/1940 | Hoyt | 40/219 |
| 2,285,509 | 6/1942 | Goshaw | 358/254 |
| 2,576,147 | 11/1951 | Sauvage | 272/8 M |
| 3,036,154 | 5/1962 | Harman | 358/238 |
| 3,048,654 | 8/1962 | Schade, Sr. | 358/238 |
| 3,096,389 | 7/1963 | Dudley | 353/10 |
| 4,281,353 | 7/1981 | Scarborough, Jr. | 358/238 |
| 4,491,872 | 1/1985 | Boldt et al. | 358/237 |
| 4,556,913 | 12/1985 | Van Breemen et al. | 358/237 |

FOREIGN PATENT DOCUMENTS 116380  9/1981  Japan ................................. 358/237

Primary Examiner—Gene Mancene
Assistant Examiner—Cary E. Stone
Attorney, Agent, or Firm—Bogucki, Scherlacher, Mok & Roth

[57] ABSTRACT

A display device for displaying an image by forming same in a space includes a concave mirror having a reflecting mirror surface of a dark color and a luminous screen for displaying a picture thereon. Light is prevented by a light shielding structure from falling in around the luminous screen. The concave mirror and the luminous screen are arranged such that light from the luminous screen will be reflected by the concave mirror to form the real image of the picture on the luminous screen in front of the concave mirror. The display device can produce visual effects of much interest and is highly effective in many applications such as display and advertisement of products for sale.

11 Claims, 3 Drawing Sheets 4,776,118

DISPLAY DEVICE

BACKGROUND OF THE INVENTION

The present invention relates to a display device, and more particularly to a display device for displaying an image by forming same in a space.

Display devices are used in many applications such as video monitors, simulators, various devices for office use, game machines, and devices for public announcement and advertisement. One of the most important features that can be produced by the display devices is a visual effect. Mostly, the user considers a desired visual effect as the most important criterion in selecting a display device type. Therefore, different types of display devices have heretofore been proposed to meet various demands.

SUMMARY OF THE INVENTION

The present invention has been achieved in an effort to provide a display device capable of producing a novel visual effect.

It is an object of the present invention to provide a display device for displaying an image by forming same in space.

Another object of the present invention is to provide a display device of the type described above which is relatively simple in construction.

According to the present invention, a display device comprises a concave mirror having a reflecting mirror surface of a dark color, a luminous screen for displaying a picture thereon, and a light shielding means for preventing light from falling in around the luminous screen, the concave mirror and the luminous screen being arranged such that light from the luminous screen can be reflected by the concave mirror to form the real image of the picture on the screen in front of the concave mirror.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
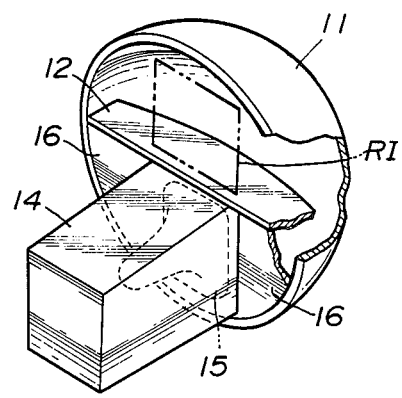
FIG. 1 is a perspective view, partly broken away, of a display device according to a first embodiment of the present invention.
Figure 2:
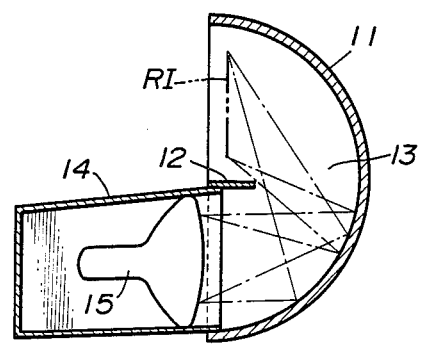
FIG. 2 is a sectional side elevational view of the display device shown in FIG. 1.

A display device according to a first embodiment of the present invention will be described with reference to FIGS. 1 and 2. The display device has a substantially hemispherical concave mirror 11 with its axis directed substantially horizontally. The concave mirror 11 has a reflecting mirror surface of a dark color, preferably black. A horizontal plate 12 made of a light shielding material is attached to the concave mirror 11 in front of the mirror surface, and positioned substantially centrally of the vertical dimension of the concave mirror 11. The horizontal plate 12 has a front edge lying in substantially coplanar relation to the circular peripheral edge of the concave mirror 11, there being an opening 13 defined between the rear edge of the horizontal plate 12 and the mirror surface of the concave mirror 11. A box 14 is attached to a lower portion of the concave mirror 11. A cathode-ray tube (CRT) 15 is disposed in the box 14 with its screen directed toward the mirror surface of the concave mirror 11. As well known in the art, the CRTs generally have luminous screens for displaying pictures thereon. Areas defined by side edges of the end of the box 14 which is closer to the concave mirror 11, part of the front edge of the horizontal plate 12, and part of the peripheral edge of the concave mirror 11, are covered with light shielding plates 16. The CRT 15 is substantially surrounded by the lower portion of the concave mirror 11, the box 14, the horizontal plate 12, and the light shielding plates 16, so that light will not fall in around the CRT screen. As shown in FIG. 2, the concave mirror 11 and the CRT 15 are arranged such that light from the screen of the CRT 15 is reflected by the concave mirror 11 as indicated by the dot-and-dash lines to form the real image RI of a picture on the screen in a space on and above the horizontal plate 12. The opening 13 is designed not to obstruct such image formation. The real image RI thus formed can clearly be seen by the observer since the mirror surface of the concave mirror 11 is of a dark color and no light falls in around the screen of the CRT 15.

Where a television receiver, as inverted upside down, is employed in place of the CRT 15, broadcast picture images can be displayed in the space on and above the horizontal plate 12. Furthermore, the CRT 15 may be replaced with various display units using luminous screens. For example, display boards comprising light-emitting elements such as light-emitting diodes, tubes with filaments in the shape of alphanumeric letters and digits being sealed therein, or small-size discharge tubes may be employed. Another example of such display units is an electric video display system comprising a matrix of small electric lamps. In addition, there may be used a luminous screen of the type which does not emit light by itself, but reflects light falling thereon. One example of such a luminous screen is a screen onto which a picture image is projected by a projector.

Each of the light shielding plates 16 and the horizontal plate 12 may comprise a polarizing plate. With such an arrangement, other polarizing plates are combined with the light shielding plates 16 and the horizontal plate 12 to form only the real image of a picture on the luminous screen in the space on and above the horizontal plate, but not other images in that space.

The visual effect of the display device which allows an image to be viewed in the space on and above the horizontal plate is also effective to produce other visual effects by arranging the types of objects, pictures of which are to be displayed on the luminous screen, and the positions in which the real images of such pictures are to be formed, as follows: Where an object placed on a tabletop is to be imaged, the position of the real image of the tabletop may be brought into substantial conformity with the upper surface of the horizontal plate, so that the object can be viewed as if placed on the horizontal plate. Another visual effect can be produced in this case by placing an actual object on the horizontal plate for comparison thereof with the real image formed by the concave mirror.

Figure 3:
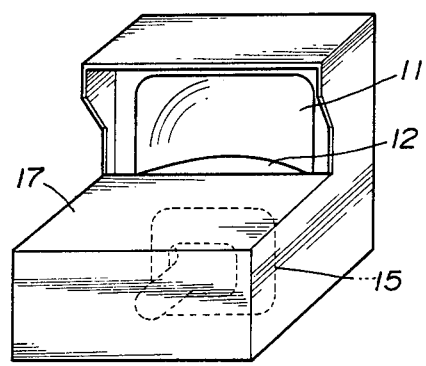
FIG. 3 is a perspective view of a display device according to a second embodiment of the present invention.

FIG. 3 shows a display device according to a second embodiment of the present invention. The display device shown in FIG. 3 has a concave mirror 11, a horizontal plate 12, and a CRT 15 which are identical to those of the first embodiment and positioned in the same manner as those of the first embodiment. The display device of FIG. 3 uses no light shielding plates, but employs a console 17 accommodating therein the concave mirror 11, the horizontal plate 12, and the CRT 15 for preventing light from falling or straying in around the luminous screen of the CRT 15. The console 17 may be of various designs to meet desired display requirements.

Figure 4:
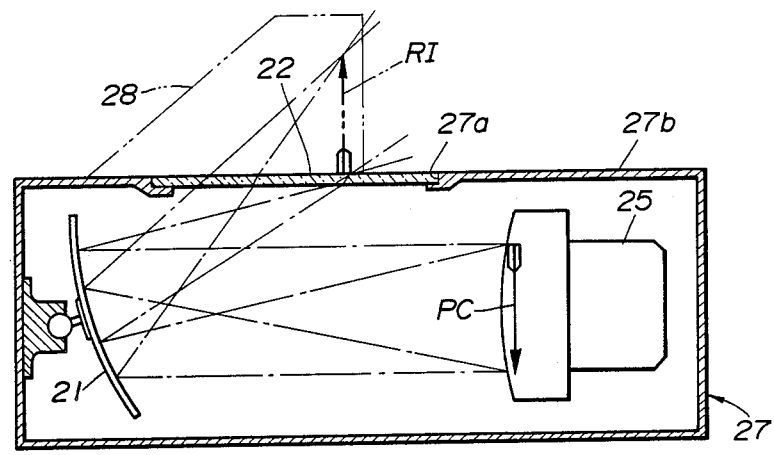
FIG. 4 is a sectional side elevational view of a display device according to a third embodiment of the present invention.
Figure 5:
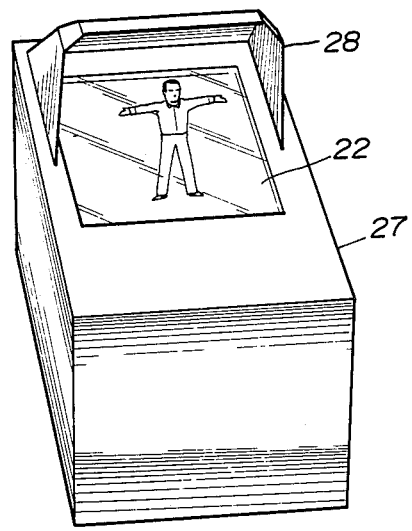
FIG. 5 is a perspective view of the display device illustrated in FIG. 4.
Figure 6:
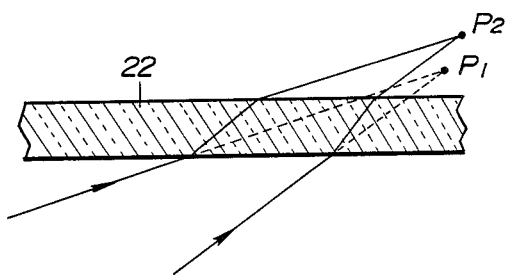
FIG. 6 is an enlarged fragmentary cross-sectional view explaining the manner in which a light beam is refracted by a transparent panel in the display device of FIG. 4.

According to a third embodiment shown in FIGS. 4 through 6, a concave mirror 21 and a CRT 25 are housed in a dark box 27. The CRT 25 is angularly adjustably positioned in the dark box 27 near one end thereof with its screen directed toward the other end of the dark box 27. The concave mirror 21 is mounted by a ball-and-socket joint on the inner wall surface at the other end of the dark box 27, the concave mirror 21 having a reflecting mirror surface of a dark color. The mirror surface of the concave mirror 21 is substantially directed toward the screen of the CRT 25 and slightly tilted upwardly, as shown in FIG. 4. The concave mirror 21 is angularly adjustable by the ball-and-socket joint. Through angular adjustment of the CRT 25 and the concave mirror 21, the real image of a picture on the CRT screen can be formed as an erect image. The mirror surface of the concave mirror 21 is slightly larger in area than the screen of the CRT 25. The CRT 25 maybe replaced with various other means having luminous screens. The color of the mirror surface of the concave mirror 21 should preferably be black. The dark box 27 has a window 27a defined in its upper wall 27b and holding a transparent panel 22 fitted therein. The transparent panel 22 may be made of completely transparent glass or plastic, or a semitransparent material such as colored glass or plastics. The concave mirror 21 and the CRT 25 are arranged such that light from the screen of the CRT 25 is reflected by the concave mirror 21 as indicated by the dot-and-dash lines in FIG. 4 to form the real image RI of a picture PC on the CRT screen in a space which is in front of the concave mirror 21 and on and above the transparent panel 22. Where the display device is installed in too bright of an area, a hood 28 may be mounted on the upper wall 27b of the dark box 27 around the window 27a to enable the real image RI on the transparent panel 22 to be viewed more clearly.

The transparent panel 22 can produce the same visual effects as those of the horizontal plate 12 of the first embodiment. More specifically, as shown in FIG. 5, where the real image of a small human figure is to be formed on the transparent panel 22, the screen of the CRT 25 and the mirror surface of the concave mirror 21 may be angularly adjusted in order to bring the position of the real image of the floor or surface on which the human figure stands into substantial conformity with the upper surface of the transparent panel 22. With this arrangement, the display device can display the small human figure as if it stood on the transparent panel 22. This visual effect can be emphasized by using a colored sheet of glass or plastic as the transparent panel 22, and becomes greater as the position of the real image of the floor or surface on which the human figure stands is brought closer to the upper surface of the transparent panel 22. To provide such a visual effect sufficiently, the influence of refraction of light by the transparent panel 22 on the position where the real image is formed should be taken into account. Specifically, as shown in FIG. 6, the real image which would be formed in a position P1 by a light beam travelling along the dotted lines without the transparent panel 22 is actually formed in a position P2 by a light beam travelling along the solid lines through the transparent panel 22. Stated otherwise, the real image thus formed is shifted upwardly due to refraction of light by the transparent panel 22.

Figure 7:
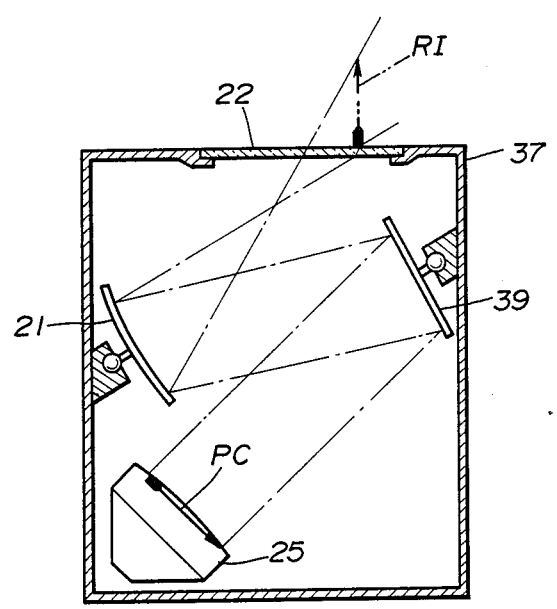
FIG. 7 is a sectional side elevational view of a display device according to a fourth embodiment of the present invention.

FIG. 7 shows a display device according to a fourth embodiment. The display device illustrated in FIG. 7 is a modification of the display device of the third embodiment. Specifically, the display device of FIG. 7 has a plane mirror 39 for reflecting light from the screen of the CRT 25 toward the concave mirror 21. The dimensions and shape of a dark box 37 and the positions of the CRT 25 and the concave mirror 21 in the dark box 37 are different from those shown in FIG. 4 so as to accommodate the plane mirror 39 in the dark box 37. The other structural details of the display device of FIG. 7 remain substantially the same as those of the display device shown in FIG. 4. The plane mirror 39 in the display device according to the fourth embodiment allows the display device to be designed with a greater degree of flexibility.

Since the display device according to the present invention can produce visual effects of much interest in attracting viewer's attention, it is highly effective when used to display and advertise various products for sale or in combination with various devices such as game machines.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A display device comprising:
   a concave mirror having a substantially hemispherical shape with an axis directed substantially horizontally and having a black reflecting mirror surface;
   a luminous screen for displaying an image thereon;
   light shielding means for preventing light from falling on and around said luminous screen;
   a horizontal plate disposed substantially centrally within said concave mirror with an opening between a rear edge of the plate and the reflecting mirror surface;

said concave mirror and said luminous screen being arranged such that light from said luminous screen can be reflected by said concave mirror and the reflected light can pass through the opening to form a real image in a space in front of said reflecting mirror surface.

2. A display device according to claim 1, wherein said luminous screen is a luminous surface of a cathode ray tube.

3. A display device comprising:
a concave mirror having a substantially hemispherical shape with an axis directed substantially horizontally and having a black reflecting mirror surface;
a luminous screen for displaying a picture thereon;
light shielding means for preventing light from falling on and around said luminous screen;
said concave mirror and said luminous screen being arranged such that light from said luminous screen forming an image of the picture can be reflected by said concave mirror to form a real image of said picture in a space in front of said reflecting mirror surface; and
a horizontal plate attached to said concave mirror in front of said reflecting mirror surface, said horizontal plate being positioned substantially centrally of the vertical dimension of said concave mirror, said horizontal plate and said reflecting mirror surface jointly defining an opening therebetween.

4. A display device according to claim 3, further including a box attached to a lower portion of said concave mirror, said luminous screen being disposed in said box, said light shielding means comprising said lower portion of said concave mirror, said box, said horizontal plate, and light shielding plates connected to said lower portion, said concave mirror, said box, and said horizontal plate.

5. A display device according to claim 4, wherein said concave mirror and said luminous screen are arranged such that light from said luminous screen will be reflected by said concave mirror to form the real image of said picture on said luminous screen in a space on and above said horizontal plate.

6. A display device according to claim 5, wherein said luminous screen comprises the screen of a cathode-ray tube.

7. A display device comprising:
a dark box having side walls, front and rear walls and a top wall, said dark box including a horizontal transparent panel on its top wall;
a display source angularly adjustable within said dark box and displaying an image thereon; and
a concave mirror placed within said dark box, said concave mirror having a black reflecting mirror surface disposed to receive and reflect said image displayed on the display source to form a real image in an upright fashion in a space on said horizontal transparent panel.

8. A display device according to claim 7, further including a plane mirror for reflecting light from said luminous screen toward said concave mirror.

9. A display device according to claim 7, further including a hood mounted on said dark box, the hood extending around said window and shielding the window while permitting the image to be viewed.

10. A display device comprising:
a display source for displaying a picture;
a light shield disposed to prevent light from falling in and around the picture;
a hemispherical concave mirror having a reflecting mirror surface of a dark color disposed to receive and reflect light from the displayed picture to form a real image of the displayed picture in front of the reflecting mirror surface and adjacent to the displayed picture, said hemispherical concave mirror having an axis wherein the display source is dispensed on one side of the axis and wherein the real image is formed on a side of the axis opposite the one side, and in a space within the interior space of the hemispherical mirror; and
a plate extending substantially diametrically across the interior space of the mirror and separating the displayed picture from the real image of the displayed picture.

11. A display device according to claim 10 wherein the real image of the picture is formed by a single direct reflection from the display source to the concave mirror to the real image with no other reflection.

* * * * *